H. W. COLE.
BALL BEARING BIT TURN TABLE.
APPLICATION FILED MAR. 26, 1918.
1,285,945.
Patented Nov. 26, 1918.
2 SHEETS—SHEET 1.
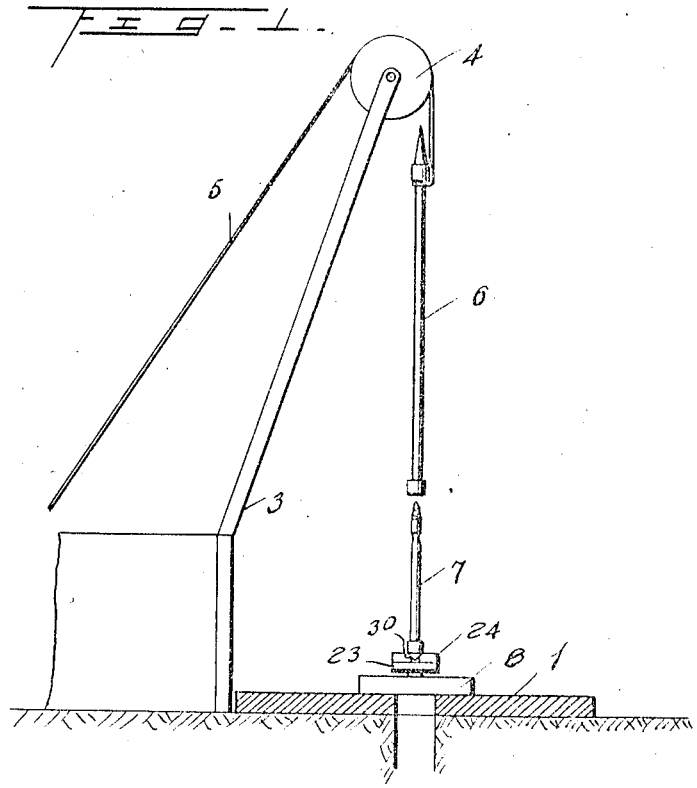
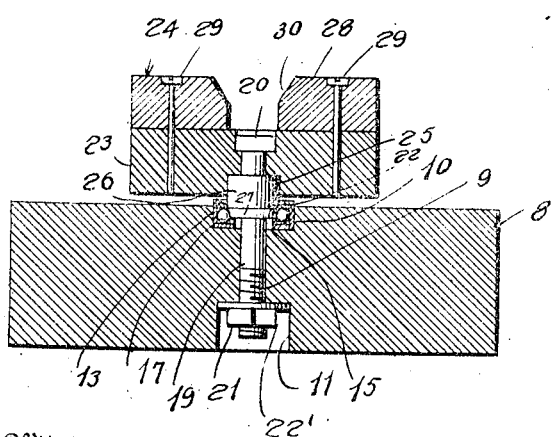
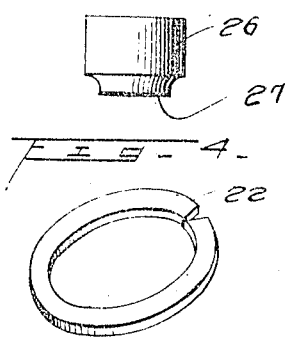
Witnesses
Inventor
H. W. Cole.
Attorney H. W. COLE.
BALL BEARING BIT TURN TABLE.
APPLICATION FILED MAR. 26, 1918.
1,285,945.
Patented Nov. 26, 1918.
2 SHEETS—SHEET 2.
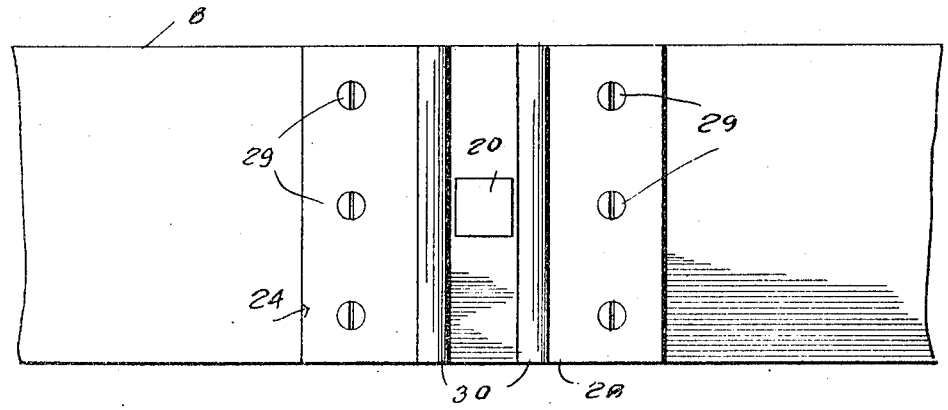
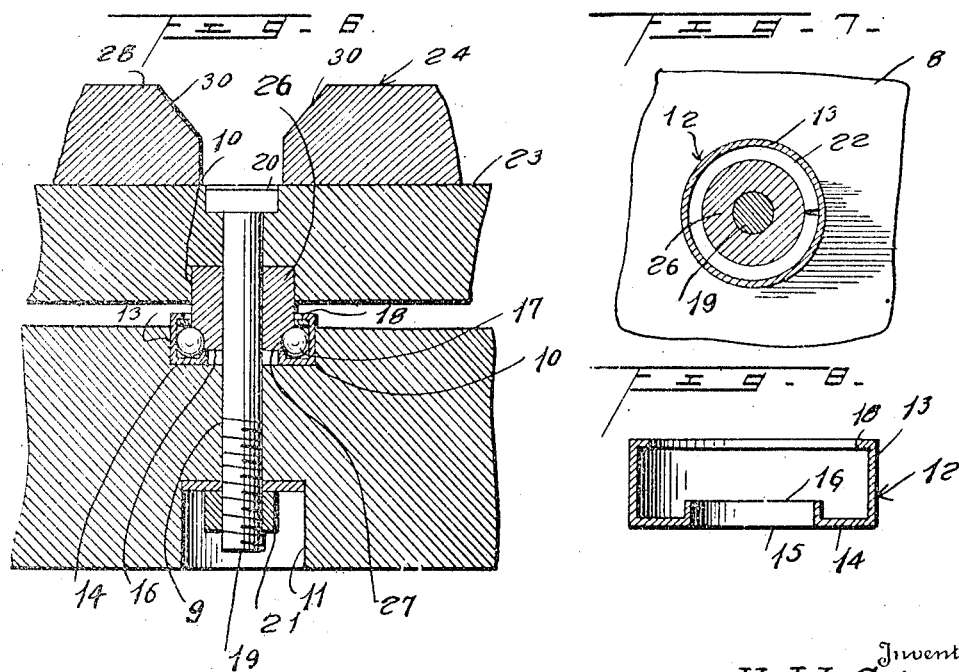

UNITED STATES PATENT OFFICE.

HOWARD W. COLE, OF BLUEJACKET, OKLAHOMA.

BALL-BEARING BIT TURN-TABLE.

1,285,945.   Specification of Letters Patent.   Patented Nov. 26, 1918.

Application filed March 26, 1918.   Serial No. 224,779.

*To all whom it may concern:*

Be it known that I, HOWARD W. COLE, a citizen of the United States, residing at Bluejacket, in the county of Craig and State of Oklahoma, have invented certain new and useful Improvements in Ball-Bearing Bit Turn-Tables; and I do hereby declare the following to be a full, clear, and exact description of the invention, such as will enable others skilled in the art to which it appertains to make and use the same.

This invention relates to improvements in turn tables and has for one of its objects, the provision of a device of this character especially adapted for supporting drill bits so that they can be quickly and conveniently connected to the drill bar of a drilling machine, thereby obviating the necessity of manually holding and supporting the drill when making the connection to the drill bar.

Another object of this invention is the provision of a supporting sill adapted to be positioned over the drill hole of the well and carrying the turn table, so that the drill can be placed thereon and coupled to the drill that is disposed over the well by rotating the turn table.

A further object of this invention is the provision of a ball bearing bit turn table of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation of a ball bearing bit turn table constructed in accordance with my invention, Fig. 2 is a vertical sectional view of the same, Fig. 3 is a side elevation of a bearing cone, Fig. 4 is a perspective view of a split washer, Fig. 5 is a plan view of the turn table, Fig. 6 is a similar view to Fig. 2 drawn in an enlarged scale illustrating the ball bearing connection between the turn table and supporting sill, Fig. 7 is a fragmentary sectional view of the split washer in position, and Fig. 8 is a vertical sectional view of the ball bearing cup.

Referring in detail to the drawing, the numeral 1 indicates a flooring disposed over a well 2. A drill derrick 3 of an ordinary construction is positioned adjacent the flooring 1 and has mounted upon its upper end the usual pulley 4 over which runs the operating cable 5 of the drill. The operating cable 5 after passing over the pulley 4 has connected thereto the drill bar 6 to which is adapted to be secured in the ordinary manner, the drill bit 7. This connection between the drill bar 6 and the drill bit 7 is so that the drill bit can be readily and conveniently detached from the bar when desired. To facilitate the removal and replacing of the drill bit 7 to the drill bar 6 I have provided a turn table in which the numeral 8 represents a sill having an opening 9 communicating with upper and lower recesses 11 and 10. A ball bearing cup 12 is positioned within the upper recess 10 and includes a cylindrical side wall 13 and a bottom wall 14 provided with a central opening 15 in registration with the opening 9 and surrounded by an annular flange 16 which coöperates with the wall 13 in forming a race way to receive the ball bearings 17. An annular flange 18 is formed upon the upper end of the wall 13 and disposed inwardly over the wall 14 for aiding in preventing the ball bearings in the cup from becoming displaced therefrom. A bolt 19 extends through the opening 9 and recesses 10 and 11 and is provided with a head 20 upon its upper end and a nut 21 threaded to its lower end. A split washer is positioned on the bolt between the top wall of the recess 11 and the nut 21 for aiding in locking the nut 21 upon the bolt. A body 23 of a turn table 24 is provided with a counter-sunk opening to receive the bolt 19 of the head 20 as clearly illustrated in Fig. 6. The opening in the body 23 is in communication with the lower recess 25 which opens outwardly through the bottom face of the body for the purpose of receiving a cone bearing 26. The cone bearing 26 is provided with a reduced extension 27 provided with a concaved wall for the purpose of engaging and conforming to the contour of the ball bearings 17 so that the body 23 may be turned in relation to the sill. The cone 26 is firmly secured within the recess 25 and loosely mounted upon the bolt 19 so that the same rotatably supports the body 23 upon the ball bearings 17, the bolt being merely for the purpose of connecting the body 23 with the sill to prevent the parts from becoming separated during use.

Relatively spaced blocks 28 are secured to the top face of the body 23 in spaced relation thereto by means of bolts 29 and have their opposed faces inclined as illustrated at 30 for the purpose of receiving the cutting end of the drill 7.

In operation, when desiring to connect the drill 7 to the drill bar, the sill 8 is placed over the boards 1 of the well 2 and the cutting end of the drill 7 is placed against the beveled or inclined faces 30 of the blocks 28 of the turn table 24. The drill is then manually held in a vertical position resting upon the turn table and the drill bar 6 is lowered so that the coupling thereof comes in engagement with the upper end of the drill 7 and by rotating the turn table 24 the drill 7 will be connected or threaded into engagement with the drill bar 6.

While I have shown and described the preferred embodiment of my invention, it will be understood that minor changes in construction, combination, and arrangement of parts may be made without departing from the spirit and scope of the invention as claimed.

What I claim as new is:—

1. A bit turn table comprising a sill, a body rotatably supported by said sill, and means on said body for engaging the cutting end of a drill so that the drill can be rotated with the body for coupling it to a drill bar.

2. A bit turn table comprising a sill, a bolt carried by said sill, a bearing cup carried by said sill and surrounding the bolt, a body carried by the bolt and in spaced relation to the sill, ball bearings in said cup, a cone carried by said body and bolt and engaging the ball bearings, and means on said body for receiving the cutting end of the bit.

3. A bit turn table comprising a sill having an opening communicating with upper and lower recesses, a bolt extending through the recesses and opening, a nut threaded to the lower end of said bolt and located within the lower recess, a split washer on said bolt between the top wall of the lower recess and the nut, ball bearings located within the upper recess, a body carried by the upper end of the bolt, a bearing element carried by said body and resting upon the ball bearings, and means upon said body for receiving the cutting end of a bit.

4. A bit turn table comprising a sill, a bolt carried by said sill, a cup carried by said sill and surrounding the bolt, ball bearings located in said cup, an annular flange formed on said cup for retaining the ball bearings therein, a body carried by said bolt and having the head thereof countersunk therein, a bearing element carried by said body and surrounding the bolt, an extension formed on said bearing member and having a concaved face to receive the ball bearings, and means carried by the body for receiving the cutting end of the bit.

5. A bit turn table comprising a sill adapted to be positioned over a well, a body rotatably mounted upon said sill, spaced blocks carried by said body and having cut away faces to receive the cutting end of a bit to permit the same to be supported and rotated in a vertical plane or coupling connection with a drill bar.

In testimony whereof I affix my signature in presence of two witnesses.

HOWARD W. COLE.

Witnesses:
 LLOYD SMITH,
 T. L. ROBINSON.